United States Patent
Carl

(10) Patent No.: US 10,078,656 B1
(45) Date of Patent: Sep. 18, 2018

(54) UNMODIFIABLE DATA IN A STORAGE SERVICE

(71) Applicant: Amazon Technologies, Inc., Reno, NV (US)

(72) Inventor: Craig Keith Carl, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 284 days.

(21) Appl. No.: 13/952,299

(22) Filed: Jul. 26, 2013

(51) Int. Cl.
*G06F 17/30* (2006.01)

(52) U.S. Cl.
CPC .............................. *G06F 17/30371* (2013.01)

(58) Field of Classification Search
CPC ......... G06F 17/30286; G06F 17/30067; G06F 17/30371
USPC ........................................ 707/609, 655, 659
See application file for complete search history.

(56) References Cited

U.S. PATENT DOCUMENTS

| | | | |
|---|---|---|---|
| 7,363,326 B2 * | 4/2008 | Margolus | G06F 17/30368 380/44 |
| 7,487,178 B2 * | 2/2009 | Hsu | G06F 21/805 |
| 8,782,009 B2 * | 7/2014 | Shaath et al. | 707/661 |
| 2002/0156767 A1 * | 10/2002 | Costa | G06F 17/30286 |
| 2005/0015375 A1 * | 1/2005 | Harjanto | G06F 17/30607 |
| 2005/0097260 A1 * | 5/2005 | McGovern et al. | 711/100 |
| 2007/0079146 A1 * | 4/2007 | Hsu | G06F 21/6218 713/194 |

* cited by examiner

*Primary Examiner* — Loc Tran
(74) *Attorney, Agent, or Firm* — Davis Wright Tremaine LLP

(57) ABSTRACT

An object-based data storage system receives a request to create a logical data container subject to a condition that data objects are to be unmodifiable until after a specified amount of time has transpired. During the amount of time, the object-based data storage system may deny any requests to modify the data objects stored in the logical data container while allowing read-only access to the data objects. After the amount of time has transpired, the object-based data storage system may be configured to allow a customer to modify or delete any data objects stored within the logical data container. Alternatively, the object-based data storage system may be configured to delete the data objects automatically after the amount of time has transpired for the data objects.

23 Claims, 10 Drawing Sheets

UNMODIFIABLE DATA IN A STORAGE SERVICE

BACKGROUND

Data storage systems have evolved and continue to evolve to keep up with the demands of the organizations that use them. Many organizations, for example, utilize data storage systems for, among other reasons, the purpose of redundant data storage, including the storage of sensitive or proprietary materials. Despite their many advantages, many conventional data storage systems lack functionality for persistently storing data while simultaneously guaranteeing that the data has not been modified since storage. For example, certain government regulations require that certain data, such as banking statements, when stored, cannot be modified or tampered with over a specified amount of time. Accordingly, the organizations storing the data must be able to demonstrate that the data has not been modified or tampered with.

Many organizations, for example, utilize removable "write once read many" (WORM) storage devices to persistently store data subject to these regulations. Typical WORM storage devices include removable media such as compact disc-recordable (CD-R) and digital video disc-recordable (DVD-R) disks which prevent a user from recording on a region of a disk more than once. Other types of WORM storage devices include devices specifically configured to store data persistently while preventing modification or deletion of the data. However, such devices may be difficult to scale to the needs of the organizations that utilize them. Adequately addressing these issues, such as through purchasing additional specifically configured devices to support additional WORM data storage, presents additional costs to the organizations that utilizer them as part of their business.

BRIEF DESCRIPTION OF THE DRAWINGS

Various embodiments in accordance with the present disclosure will be described with reference to the drawings, in which.

DETAILED DESCRIPTION

Figure 1:
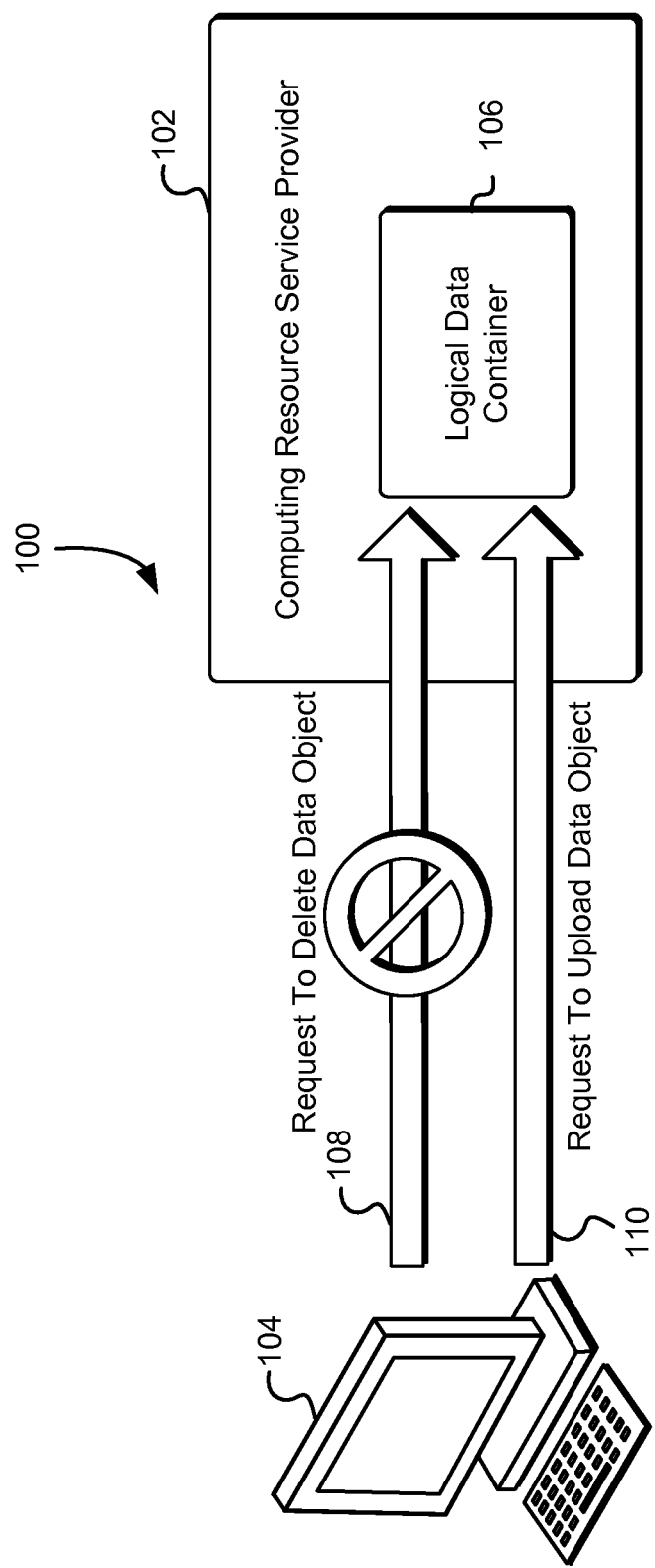
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to a computer-implemented technique for storing data in a WORM logical data container in an object-based data storage system. In an embodiment, an entity (e.g., an organization) may communicate with an object-based data storage service, such as through appropriately configured application programming interface (API) calls to the service, to request creation of a WORM logical data container that may, for example, be utilized to persistently store data and prevent future modification or deletion of data. The entity may be a customer of a computing resource service provider that operates various services such as virtual computer system service, object-based data storage services and/or database services. When a WORM logical data container is created in the object-based data storage system, the system may receive data objects from the entity and persistently store the data objects in the WORM logical data container. In some embodiments, the data objects may include an expiration date such that an entity may not be permitted to delete or modify the data objects in any way prior to the expiration date. The object-based data storage system may be configured such that after the expiration date, the data object may be deleted automatically. Alternatively, the object-based data storage system may be configured to permit an entity to modify or delete the data object manually once the expiration date has passed.

In some embodiments, an entity may interface with the object-based data storage service through a GUI configured to transmit one or more appropriately configured API calls to the service to specify the type of logical data container to be created. For instance, an entity may specify whether he or she wants to create a standard logical data container or a WORM logical data container. If the entity specifies that he or she wants to create a WORM logical data container, a request processing sub-system may be configured to transmit one or more warnings or additional information regarding the use of a WORM logical data container. Additionally, once an entity has specified that he or she wants to create a WORM logical data container, the GUI may be configured to permit an entity to specify the expiry data for any data objects that are to be stored within the WORM logical data container.

In various embodiments, once the WORM logical data container has been created, the object-based data storage system may be configured to deny any requests to delete a WORM logical data container if one or more data objects are stored therein. As noted above, the object-based data storage system may be configured to deny any requests to delete a data object stored in a WORM logical data container if the request is made prior to the expiration date set for the data object. Accordingly, the object-based data storage system may be configured to deny any requests to delete the WORM logical data container if any of the data objects stored therein cannot be deleted. Alternatively, if the expiration date for all data objects stored in a WORM logical data container has passed, a request to delete the WORM logical data container and all of its contents may be processed. In an embodiment, the object-based data storage system may also be configured to process a request to delete a WORM logical data container if no data objects are stored therein.

In an embodiment, the object-based data storage system may be configured to continuously monitor each WORM logical data container to locate any expired data objects. For instance, the object-based data storage system may be configured to select a WORM logical data container from a plurality of WORM logical data containers and examine each stored data object. If the expiration data for the data object has passed, the object-based data storage system may automatically delete the data object. The object-based data storage system may then select another data object until it has evaluated all of the data objects in a WORM logical data container. Subsequently, the object-based data storage system may be configured to evaluate all data objects in a different WORM logical data container, automatically deleting any expired data objects therein.

In this manner, an entity may be able to persistently store data in a WORM logical data container and accordingly prevent modification of the data stored therein prior to an expiration date. In addition, the techniques described and suggested herein facilitate additional technical advantages. For example, because a computing resource service provider may be able to scale the object-based storage system based on the needs of a plurality of customers, this may obviate the need of an entity to purchase additional equipment to store WORM data. This, in turn, may eliminate the cost of maintenance associated with the ownership of any equipment. Additional uses are also enabled by the various techniques described herein.

FIG. 1 shows an illustrative example of an environment 100 in which various embodiments may be practiced. In the environment 100, a computing resource service provider 102 provides various computing resource services to customers of the computing resource service provider. The computing resource service provider 102 may be an organization that hosts various computing resources on behalf of one or more customers. For example, a computing resource service provider may operate one or more facilities that are used to host various computing hardware resources, such as hardware servers, data storage devices, network devices, and other equipment, such as server racks, networking cables and the like. The computing resource service provider 102 may utilize its computing hardware resources to operate one or more services. Such services may include services that enable customers of the computing resource service provider to remotely manage computing resources to support the customers' operations while reducing or even eliminating the need of the customers to invest in physical equipment. Example services include, but are not limited to, various data storage services (object-based data storage services, archival data storage services, database services and the like), program execution services and other services. The services may be used by customers to support a wide variety of activities, such as operating a website, operating enterprise systems supporting an organization, distributed computation and/or other activities.

Accordingly, as illustrated in FIG. 1, the environment 100 includes a customer 104. The customer 104 may be an organization that could utilize one or more services provided by the computing resource service provider 102 to generate and safeguard data. For instance, the customer 104 may interact with an object-based data storage system provided by the computing resource service provider 102 to generate one or more logical data containers 106 for the persistent storage of data. As will be illustrated below, the customer 104 may specify, through appropriately configured API calls to the service, that a logical data container 106 be configured for WORM storage. Through the use of these API calls to the service, a customer 104, when storing a data object in a WORM logical data container 106, may specify an expiration date for the data object. Accordingly, a data object persistently stored in a WORM logical data container 106 may not be deleted or modified until after the expiration date has passed. Thus, as illustrated in FIG. 1, if a customer submits a request to delete a data object 108 within a WORM logical data container 106, the request may be denied. Additionally, any requests to modify any data objects within the WORM logical data container 106 prior to the expiration date of each data object subject to the requests may also be denied by the computing resource service provider 102. However, the WORM logical data container 106 may be configured to accept any request to upload a data object 110 so long as the customer 104 provides a valid expiration date for each data object to be uploaded and stored in the WORM logical data container 106.

After the expiration date has passed for a data object stored in a logical data container 106, the customer 104 may again be able to submit a request to delete a data object 108 within the WORM logical data container 106. Since the expiration date for the affected data object has passed, the logical data container 106 may be configured to allow deletion or modification of the data object. Alternatively, in an embodiment, the computing resource service provider 102 may configure the logical data container 106 to automatically delete any data objects that has passed the expiry date. In another embodiment, the computing resource service provider 102 may delete the logical data container 106 if all data objects within the logical data container 106 have passed the latest expiry date.

Figure 2:
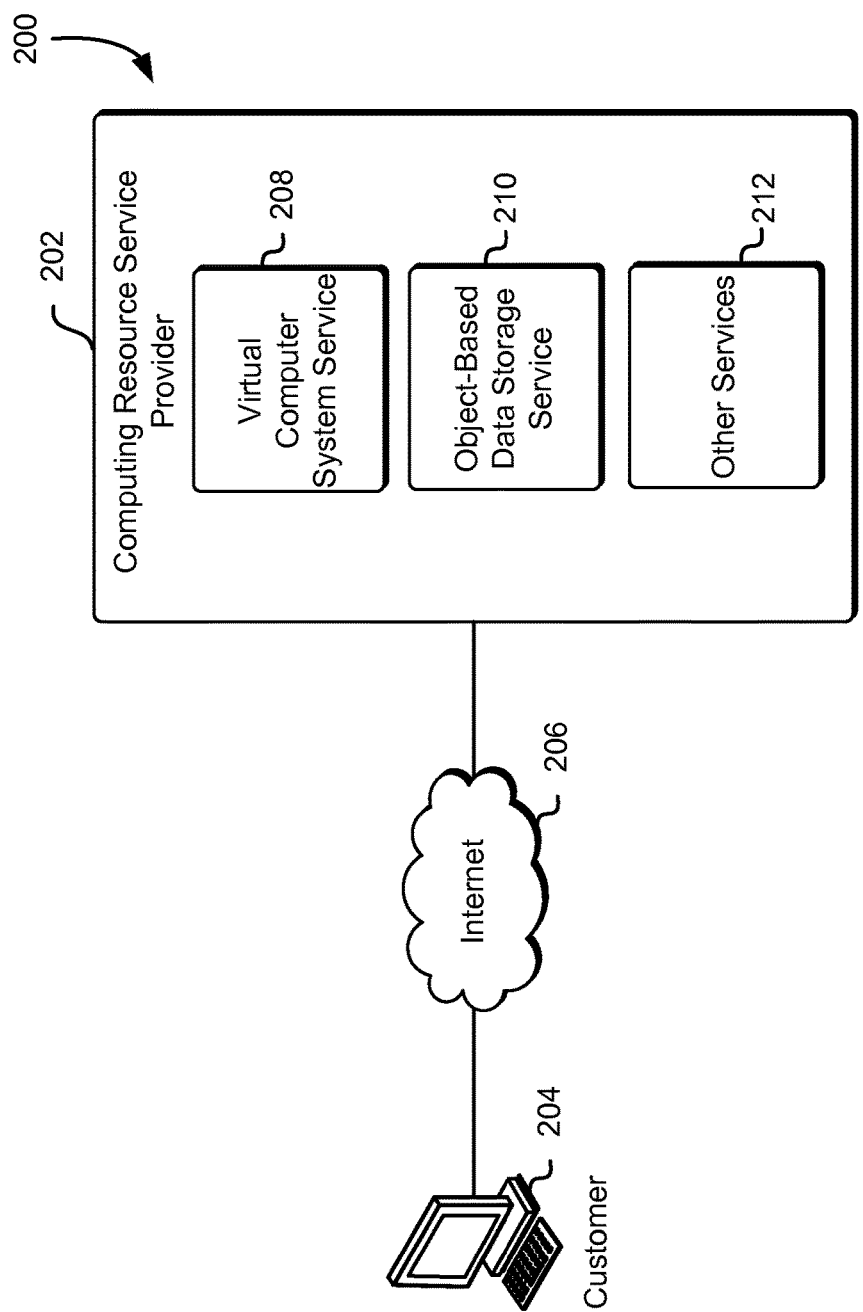
FIG. 2 shows an illustrative example of an environment in which various embodiments can be implemented.

FIG. 2 shows an illustrated example of an environment 200 in which various embodiments of the present disclosure may be practiced. In the environment 200, a computing resource service provider 202 may provide a variety of services to a customer 204. The customer 204 may be an organization that may utilize the various services provided by the computing resource service provider 202 to maintain and safeguard information in accordance with a variety of legal regulations which may serve to prohibit the tampering or deletion of such information stored therein. As illustrated in FIG. 2, the customer 204 may communicate with the computing resource service provider 202 through one or more communications networks 206, such as the Internet. Some communications from the customer 204 to the computing resource service provider 202 may cause the computing resource service provider 202 to operate in accordance with various techniques described herein or variations thereof.

As noted above, a computing resource service provider 202 may provide various computing resource services to its customers. For instance, in this particular illustrative example, the computing resource service provider 202 provides at least two types of services. The services provided by the computing resource service provider, in this example, include a virtual computer system service 208, a data storage service 210, and one or more other services 212, although not all embodiments of the present disclosure will include all such services and additional services may be provided in addition to or as an alternative to services explicitly described herein.

The virtual computer system service 208 may be a collection of computing resources configured to instantiate virtual machine instances onto virtual computing systems on behalf of the customers 204 of the computing resource service provider 202. Customers 204 of the computing resource service provider 202 may interact with the virtual computer systems' service to provision and operate virtual computer systems that are instantiated on physical computing devices hosted and operated by the computing resource service provider 202. The virtual computer systems may be used for various purposes, such as to operate as servers supporting a website. Other applications for the virtual computer systems may be to support database applications, electronic commerce applications, business applications and/or other applications.

The object-based data storage service 210 may comprise a collection of computing resources that collectively operate to store data for a customer 204. The data stored in the data storage service 210 may be organized into data objects. The data objects may have arbitrary sizes except, perhaps, for certain constraints on size. Thus, the object-based data storage service 210 may store numerous data objects of varying sizes. The object-based data storage service 210 may operate as a key value store that associates data objects with identifiers of the data objects which may be used by the customer 204 to retrieve or perform other operations in connection with the data objects stored by the object-based data storage service 210. Access to the object-based data storage service 210 may be through appropriately configured API calls.

When a customer 204 interacts with the object-based data storage service 210 to provision a logical data container, the customer 204 may be given several options for configuring the logical data container and the manner in which data objects are stored therein. For instance, as will be illustrated below in connection with FIG. 4, a customer 204 may interact with the object-based data storage service 210 through a graphical user interface (GUI) to specify the type of logical data container that is to be provisioned. The customer 204 may use the GUI to specify that he/she wishes to provision a WORM logical data container. This selection by the customer 204 may prompt the object-based data storage service 210 to modify the GUI such that the customer 204 may be required to additionally specify the duration (e.g., expiry date) of any data object that is to be stored within the logical data container.

In some embodiments, once a customer 204 has stored a data object in a WORM logical data container within the object-based data storage service 210, any request to modify or delete a data object prior to the expiration date for the data object within the WORM logical data container may be denied. However, a customer 204 may still be able to access the data object so long as it is in a read-only capacity. In an embodiment, the customer 204 may also extend the expiration date for all data objects within the logical data container, such as through the use of a GUI, as noted above. Once the expiration date has passed for a data object stored within a WORM logical data container, the customer 204 may access the object-based data storage service 210 and, through appropriately configured API calls to the service, delete or modify the data object from the logical data container.

In an embodiment, the object-based data storage service 210 may be configured to automatically delete any data objects within a WORM logical data container if the expiry date for the data object has passed. This may occur without customer 204 input and may be executed as part of the management of all WORM logical data containers. In the embodiment, the object-based data storage service 210 may be configured to locate any WORM logical data containers and go through each WORM logical data container, searching for any expired data objects. Once the object-based data storage service 210 has examined each data object in a WORM logical data container, the object-based data storage service 210 may select another WORM logical data container and repeat the above process. In this fashion, the object-based data storage service 210 may de-allocate resources which may be used to store additional data objects that may be associated with new logical data containers.

In another embodiment, the object-based data storage service 210 may receive a request from a customer 204 to delete the entire WORM logical data container from the service. In this instance, the object-based data storage service 210 may be configured to examine the targeted WORM logical data container selected for deletion and determine if there are any data objects stored therein. If there are any data storage objects stored within the WORM logical data container, the object-based data storage service 210 may proceed to determine if any of the data objects are still subject to an expiration date provided when the data object was originally stored within the WORM logical data container. If any data object is still subject to an expiration date, the object-based data storage service 210 may deny the request. However, if all data objects stored within the WORM logical data container have expired, the object-based data storage service 210 may process the customer 204 request and delete the WORM logical data container accordingly.

The computing resource service provider 202 may additionally maintain one or more other services 212 based on the needs of its customers 204. For instance, the computing resource service provider 202 may maintain a database service for its customers 204. A database service may be a collection of computing resources that collectively operate to run one or more databases for one or more customers 204. Customers 204 of the computing resource service provider 202 may operate and manage a database from the database service by utilizing appropriately configured API calls. This, in turn, may allow a customer 204 to maintain and potentially scale the operations in the database. Other services include, but are not limited to, object-level data storage services, object-level archival data storage services, services that manage other services and/or other services.

Figure 3:
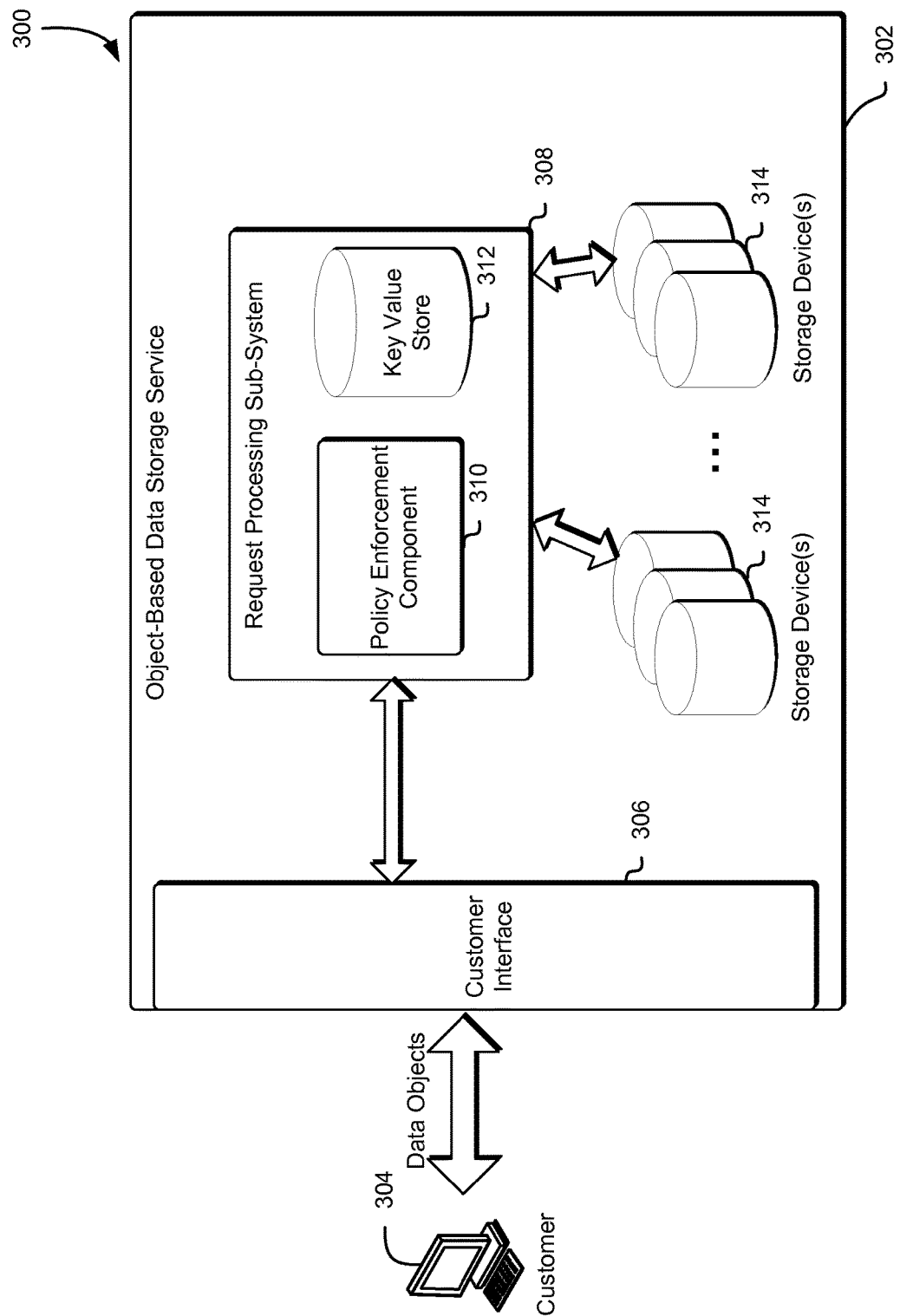
FIG. 3 shows an illustrative example of an environment in which various embodiments can be implemented.

As noted above, a customer may use an object-based data storage service to provision a logical data container for the storage of one or more data objects. The object-based data storage service may permit a customer to additionally perform certain functions once a logical data container has been provisioned (e.g., delete or modify a data object, delete a logical data container, extend the expiration date for any data objects stored within a WORM logical data container, etc.). Accordingly, FIG. 3 shows an illustrative example of an environment 300 that includes various components of an object-based data storage service 302 in accordance with at least one embodiment. The object-based data storage service 302 may provide a customer 304 with a customer interface 306 that may enable a customer 304 to access the object-based data storage service 302. A customer 304 may utilize the customer interface 306 through one or more communications networks, such as the Internet. The customer interface 306 may contain certain security safeguards to ensure that the customer 304 has authorization to access the object-based data storage service 302. For instance, in order to access the object-based data storage service 302, a customer 304 may need to provide a username and a corresponding password or encryption key when using the customer interface 306. Additionally, requests (e.g., API calls) submitted to the customer interface 306 may require an electronic signature generated using a cryptographic key such that the electronic signature is verifiable by the object-based data storage service 302, such as by an authorization system (not shown). The customer 304 may utilize the customer interface 306 using its own computer system to access the object-based data storage service 302 or through one or more other services provided by a computing resource service provider. For instance, a customer may utilize a virtual computing system service to provision a virtual computing system instance. The customer interface 306 may be configured to allow a customer 304 to interact with both the virtual computing system service to provision the instance and the object-based data storage service 302 to request storage of data created within the instance.

Once a customer 304 has used the customer interface 306 to generate a request for a logical data container, the request may be transmitted to a request processing sub-system 308 where the request may be processed or denied based on the parameters of the request. Thus, the request processing sub-system 308 may include a policy enforcement component 310 that may be configured to evaluate a request to determine whether it satisfies a pre-determined and encoded set of rules for processing. For example, as will be further illustrated in connection with FIG. 6, if a customer 304 submits a request to generate a WORM logical data container but does not provide an expiration date for the data objects to be stored in the WORM logical data container, the policy enforcement component 310 of the request processing sub-system 308 may execute encoded instructions and cause the sub-system to display an error message and deny the request. Accordingly, a customer 304 may revise his or her request by providing an expiry date for the data objects to be stored therein at which time the policy enforcement component 310 may grant the request and subsequently generate the WORM logical data container.

In order to create a logical data container in an object-based data storage system 302, the request processing sub-system 308 may be configured to create an identifier for the logical data container and update metadata for the logical data container such that, for instance, the logical data container may be associated with a customer 304 and a set of credentials. When a logical data container is created, the customer 304 may use the customer interface 306 and, through appropriately configured API calls to the service, may add data objects to the logical data container. Accordingly, the object-based data storage service 302 may allocate storage capacity from the one or more storage devices 314 for these data objects.

The request processing sub-system 308 may additionally include a key value store 312 which may be configured to store a variety of character strings. These character strings may be associated with logical data containers created by one or more customers 304 of the object-based data storage service 302. For instance, in an embodiment, a customer 304 may use the customer interface 306 to specify a name for a logical data container. The name may comprise a series of alphanumeric characters which together form a character string. If the configured policy enforcement component 310 approves the creation of the logical data container, the associated name of the logical data container may be stored in the key value store 312 as a pointer to the logical data container and the associated data objects that may be stored in the logical data container. Each data object that is associated with the logical data container may include metadata which the key value store 312 may be configured to inspect to locate these data objects when a specific logical data container is requested. Thus, when a customer 304 submits a request to access a logical data container and its associated data objects after the logical data container has been created, the customer 304 may provide a name for the logical data container. Subsequently, the key value store 312, configured to associate character strings with logical data containers within the object-based data storage service 302, may search for the name of the logical data container in a database to locate the logical data container requested by a customer 304. Additionally, the key value store 312 may be configured to locate all data objects associated with the logical data container in the one or more storage devices 314.

If a customer 304 has provided a valid name for the logical data container such that the name may be stored within a key value store 312 and the customer has additionally satisfied all other criteria (e.g., provided an expiry date for a WORM logical data container) subject to the policy enforcement component 310, the request processing sub-system 308 may interact with one or more storage devices 314 to store one or more data objects that may be associated with a logical data container. The storage devices 314 managed by the object-based data storage service 302 may comprise a plurality of drives (e.g., solid-state drives, hard disk drives, etc.), storage device units (e.g., JBOD) or data storage racks within a particular data center. The request processing sub-system 308 may be configured to identify a specific set of storage devices 314 for storing a data object associated with the logical data container. Thus, after a logical data container has been created, the customer 304 may utilize the customer interface 306 to request one or more data objects be stored and associated with the logical data container. Accordingly, the request processing sub-system 308 may be configured to utilize the policy enforcement component 310 to determine whether the data objects to be stored satisfy certain criteria. For instance, the policy enforcement component 310 may be configured to deny a request to store a data object if the data object exceeds a pre-set storage size limit. Additionally, the key value store 312 may be configured to update metadata associated with the data object to identify the data object as being part of a logical data container. Thus, if a customer 304 interacts with the object-based data storage service 302 at a later time to access one or more data objects stored in a logical data container, all the customer 304 may need to do is provide the name of the logical data container, causing the key value store 312 to locate within the storage devices 314 all data objects with metadata indicating that the data objects are part of the logical data container.

Other variations of preferences which may be used to allocate storage devices 314 for the storage of one or more data objects associated with a logical data container are considered as being within the scope of the present disclosure. For instance, a customer 304 may specify a regional preference for the creation of the logical data container. This may cause the request processing sub-system 308 to select one or more storage devices 314 located in a data center in the region specified by the customer for the storage of any data objects that are to be associated with the logical data container.

Once a logical data container has been provisioned, the key value store 312 may update metadata associated with the logical data container to associate a character string provided by a customer as the name of the logical data container with data objects to be stored in the storage devices 314. Thus, when a customer 304 utilizes the customer interface 306 to access the logical data container, the key value store 312 may be configured to find the name of the requested logical data container and identify the storage devices 314 where data objects associated with the logical data container are located. Accordingly, the request processing sub-system may be configured to allow a customer 304 to interact with the data objects in a logical data container through these storage devices 314.

Figure 4:
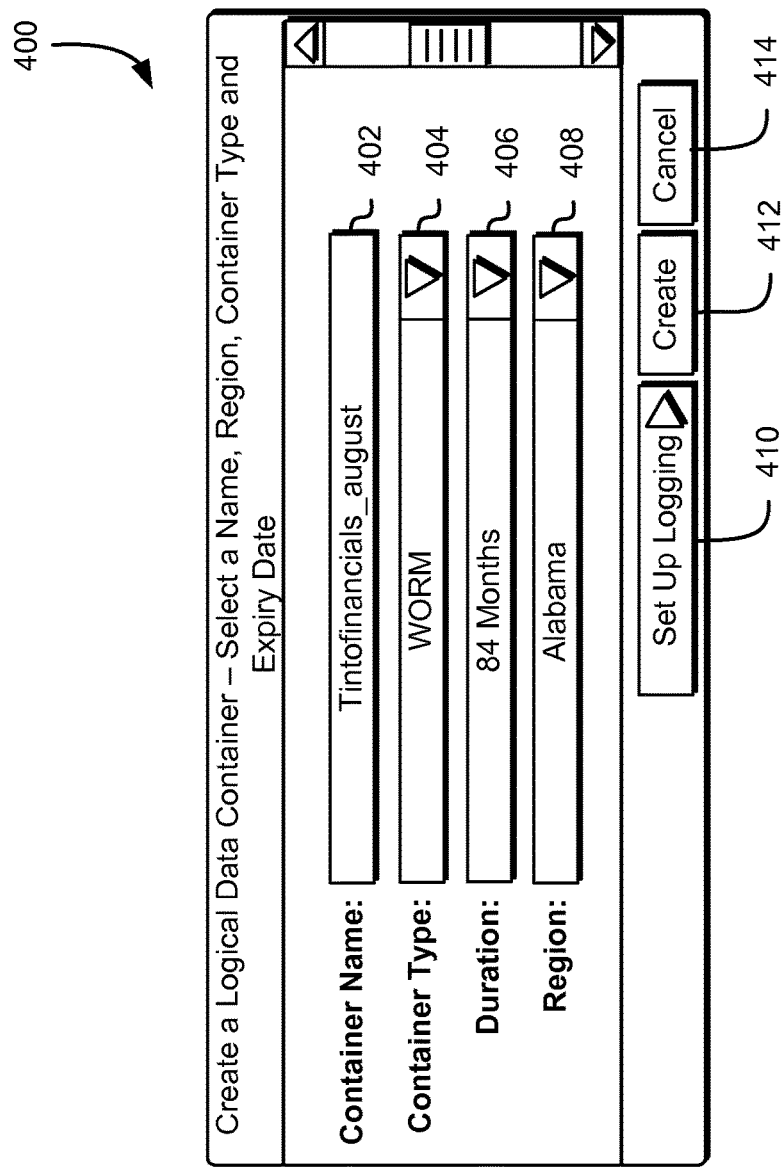
FIG. 4 shows an illustrative example of a graphical user interface (GUI) for creating a WORM logical data container in accordance with at least one embodiment.

As noted above, a customer may utilize a customer interface to create a WORM logical data container. The customer interface may be configured to supply a GUI which a customer may use to provide a plurality of parameters for the creation of the logical data container. Accordingly, FIG. 4 is an illustrative example of a GUI 400 for creating a WORM logical data container in accordance with at least one embodiment. The GUI 400 may include a container name input field 402 for introducing a name for a logical data container. As noted above, the name provided by a customer may be stored in a key data store within a request processing sub-system. In order for the name to be stored in the key value store, the customer may need to follow certain criteria when naming the logical data container. For instance, a customer may be required to only use alphanumeric characters when inputting a name into the container name input field 402. Additionally, a customer may be restricted in the number of characters that he or she may use in naming a logical data container. Other variations of restrictions imposed on the naming of a logical data container are considered as being within the scope of the present disclosure. For instance, the object-based data storage service may configure the GUI to not allow the use of a name utilized for an existing logical data container on a new logical data container.

The GUI 400 may be configured to allow a customer to specify what type of logical data container is to be created within the object-based data storage service. Thus, the GUI 400 may include a container type input field 404. In this illustrative example, the container type input field 404 may include a WORM logical data container. The container type input field 404 may be configured to include a drop-down menu that, with customer interaction with the field, may present other container type options. For instance, the container type input field 404 may be configured to include options for standard (e.g., non-WORM) logical data containers, encrypted logical data containers and the like. In an embodiment, and as will be demonstrated in connection with FIG. 6, if a customer selects a WORM logical data container from the container type input field 404, the GUI 400 may be configured to display one or more warnings or additional information regarding the restrictions and use of a WORM logical data container. Thus, a customer may be given sufficient information to make a decision regarding the use of a WORM logical data container.

If a customer selects a WORM logical data container from the container type input field 404, the GUI 400 may be configured to display one or more additional fields that may be necessary for the creation of a logical data container. For instance, in this illustrative example, the GUI 400 includes a duration input field 406 which may be used to determine the expiry date for any data objects introduced into a WORM logical data container. The duration input field 406 may be configured to include a plurality of time periods which may be accessed through a drop-down menu within the duration input field 406. The duration may be specified in, for example, days, months, years or any other time measurement. Alternatively, the duration input field 406 may be configured to include a plurality of names of regulations which may have time period associated with them. For instance, a regulation enacted by a legislature may specify that data shall not be tampered with or deleted within a specified amount of time. Thus, the object-based data storage service may associate a time period with the regulation, enabling it to configure the duration input field 406 with a list of regulations. Once a regulation has been selected, the object-based data storage service may utilize the request processing sub-system to assign an expiry date to data objects based on the regulation chosen.

As noted above, one or more data storage devices may be used to provision a logical data container. These data storage devices may be located in data centers in different geographical regions. Ideally, a customer may want to allocate one or more data storage devices in his or her geographical region to the logical data container in order to reduce potential issues with latency. Accordingly, the GUI 400 may include a region input field 408 which may be used by a customer to specify a region from which data storage services may be pooled to provision the logical data container. As with the container type input field 404 and the duration input field 406, the region input field 408 may include a drop-down menu comprising a list of regions in which the object-based data storage service maintains one or more data centers. In this illustrative example, the region input field 408 may comprise a number of states within the United States where data centers may be located. However, the region input field 408 may otherwise comprise a number of regions within and without the United States and based on countries or continents.

A customer may use the GUI 400 to specify what kind of logging the object-based data storage service should conduct when a customer or other user accesses a logical data container. Thus, the GUI 400 may include a set up logging button 410 which may allow a customer to specify the logging to be performed when the customer or another user accesses the logical data container. The GUI 400 may be configured to transmit one or more executable instructions to the customer interface to generate a separate GUI should a customer click on the set up logging button 410. This separate GUI may allow a customer to specify how to log any interactions with the logical data container. For instance, the customer may specify that the object-based data storage service should maintain a log of all read or write activity within a logical data container and store said log in a certain file format (e.g., .txt, .log, .doc, etc.).

The GUI 400 may include a create button 412 which may be used to generate a request that may be transmitted from the customer interface to the request processing sub-system. The request may include the input values provided in the input fields above in the GUI 400. For instance, based on the inputs provided in this illustrative example, the GUI 400 may transmit a request to create a WORM logical data container named "Tintofinancials august" with a set duration of eighty-four (84) months for any data object stored therein using one or more storage devices based in one or more data centers in Alabama. Accordingly, the request processing sub-system may store the name of the logical data container in the key value store while one or more data storage devices from an Alabama data center are allocated to the WORM logical data container.

In an embodiment, if a customer specifies through the container type input field 404 that he or she wants to generate a WORM logical data container but has not provided a duration for the data objects to be stored in the WORM logical data container or has provided an invalid container name, upon clicking on the create button 412, the policy enforcement component of the request processing sub-system may transmit an error message to the customer interface, causing the customer interface to display the error message to the customer. The error message may include steps required to rectify the error or any other information that may be useful to a customer.

If a customer no longer wants to create a logical data container, the customer may cancel his or her request and exit the customer interface at any time. Accordingly, the GUI 400 may include a cancel button 414 which, when clicked by a customer, may cause the GUI 400 to close and return the customer to a main screen on the customer interface. The GUI 400 may be configured to display a prompt which may require customer verification to cancel a request or to close the GUI 400. It should be noted that the input fields and buttons provided in this illustrative example are not exhaustive and different variations are considered as within the scope of this disclosure. For instance, if a customer is utilizing a block-level data storage service to create a data volume which may be used as a logical data container, the GUI 400 may include an additional input field for providing the data storage capacity of the logical data container to be created.

Figure 5:
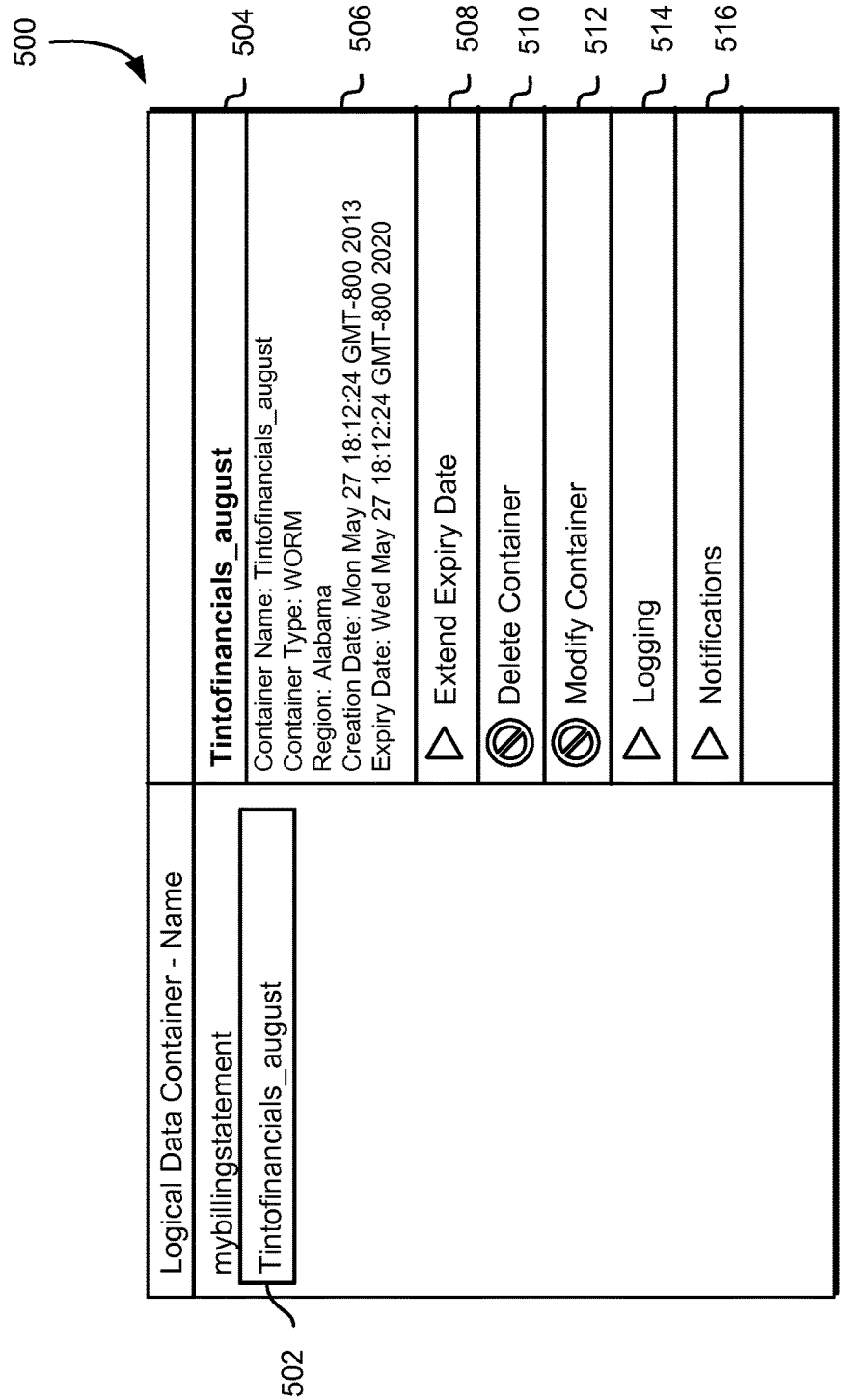
FIG. 5 shows an illustrative example of a GUI for performing one or more actions on a WORM logical data container in accordance with at least one embodiment.

Once a WORM logical data container has been created, a customer may utilize the customer interface provided by the object-based data storage service to access the WORM logical data container. Accordingly, FIG. 5 is an illustrative example of a GUI 500 for interacting with a WORM logical data container in accordance with at least one embodiment. When a customer interacts with a customer interface to access one or more logical data containers, the customer may be provided with a GUI 500 including a list of a plurality of logical data container names for logical data containers the customer may have created. The GUI 500 may be configured to allow a customer to select a logical data container name from the list by clicking on the name of the logical data container. This action may highlight the specified logical data container name 502 and cause the GUI 500 to display information related to the specified logical data container name 502.

The selection of a logical data container name may cause a key value store to locate metadata associated with the logical data container name and transmit this metadata to the customer interface for display in the GUI 500. Accordingly, the GUI 500 may include a name display field 504 for displaying the logical data container name. This name display field 504 may be used to verify that the selected logical data container has been located. The GUI 500 may additionally include an information display field 506 for displaying the characteristics of the logical data container and other pertinent information. For instance, in this illustrative example, the information display field 506 may be configured to display the name of the logical data container, the container type, the region in which the logical data container is stored, the date and time the logical data container was created and the expiration date of a data object stored within the logical data container. It should be noted that this list is not exhaustive and additional information related to the logical data container may be displayed in the information display field 506.

The GUI 500 may be configured to modify the interactive fields within the GUI 500 based on the type of logical data container that is being accessed. For instance, if a customer has selected a WORM logical data container from the list of logical data containers, the GUI 500 may provide a customer with an extend expiry date field 508. The extend expiry date field 508 may be configured to allow a customer to specify a later expiration date for any data objects stored within a WORM logical data container. If a customer clicks on the extend expiry date field 508, the GUI 500 may cause the customer interface to display a new GUI with one or more input fields for providing a new expiry date. These one or more input fields may be similar to the duration input field illustration in FIG. 4. By changing the expiry date, the information display 506 may be updated to display the new expiry date for a data object stored in the logical data container.

As noted above, if a customer creates a WORM logical data container, the customer may not be allowed to delete or modify any data objects so long as the expiration date for the data objects has not transpired. Additionally, a customer may not be permitted to delete or modify the WORM logical data container itself until all data objects within the WORM logical data container have expired. Accordingly, the GUI 500 may be configured to provide a delete logical data container field 510 and a modify logical data container field 512. If the data objects included in a WORM logical data container have not expired, the delete logical data container field 510 and the modify logical data container field 512 may be inaccessible. As illustrated in FIG. 5, these fields may include a prohibition sign indicating that a customer may not perform these actions. Additionally, the GUI 500 may be configured to disable any actions should a customer click on these fields. Once the expiration date has passed on the last data object within the WORM logical data container, the GUI 500 may be configured to permit a customer to utilize the delete logical data container field 510 and the modify logical data container field 512.

When creating a logical data container, a customer may have specified what sort of information is to be logged when the customer or another user accesses the logical data container. Accordingly, the GUI 500 may include a logging field 514 which may allow a customer to access one or more logs associated with the logical data container. If a customer clicks on the logging field 514, the GUI 500 may transmit one or more executable instructions which may cause the customer interface to display a separate GUI with a list of logs available for viewing. These logs may be accessed through a data store within the request processing sub-system or a separate sub-system within the object-based data storage service.

Throughout the lifecycle of the logical data container, the object-based data storage service may transmit a variety of notifications to its customers regarding the service. For instance, the object-based data storage service may notify its customers of any new data centers in operation or of any significant down time due to maintenance issues. These notifications may be pushed out to the customers through the customer interface and the GUI 500. Accordingly, the GUI 500 may include a notifications field 516. If a customer clicks on the notifications field 516, the GUI 500 may cause the customer interface to display a new GUI with a list of any notifications that may be available for customer viewing. The notifications field 516 may additionally be configured to display one or more symbols to illustrate and inform a customer that new notifications have been generated since a last visit. While the present elements of the GUI 500 are used extensively throughout the present disclosure for the purpose of illustration, the scope of the present disclosure is not necessarily limited to the elements explicitly noted therein.

Figure 6:
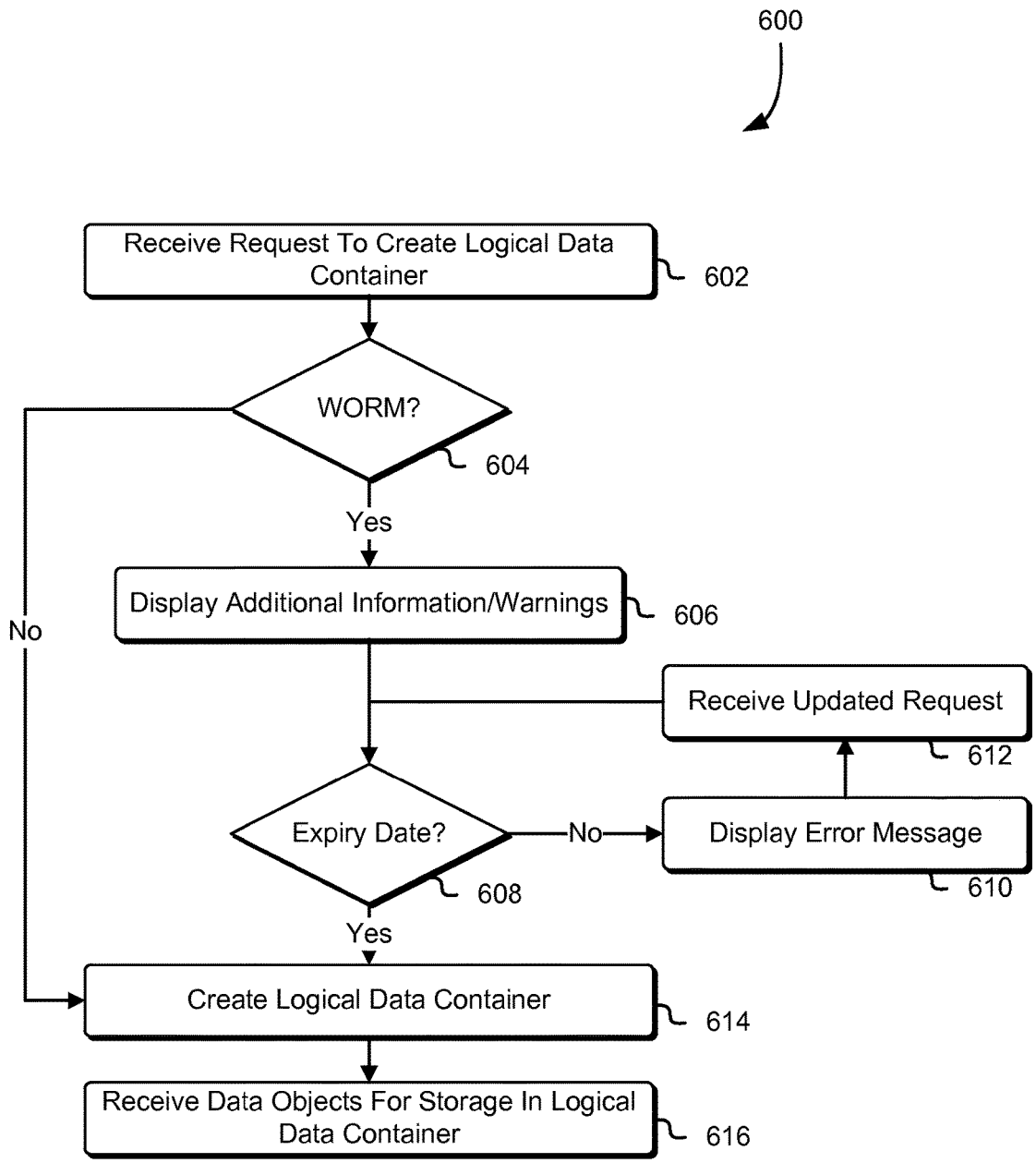
FIG. 6 shows an illustrative example of a process for creating a WORM logical data container in accordance with at least one embodiment.

FIG. 6 is an illustrative example of a process 600 for creating a WORM logical data container in accordance with at least one embodiment. A customer may submit a request to create a logical data container through one or more properly configured API calls to the service. The customer request to create a logical data container may specify the kind of logical data container to be created and associated parameters that may be used to further define the logical data container. The customer request may be transmitted from a customer interface, as illustrated in FIG. 3, to the request processing sub-system for evaluation and fulfillment. Accordingly, the process 600 includes receiving 602 a request to create a logical data container from a customer. The request processing sub-system may be configured to evaluate a request upon receipt in order to determine whether the request meets all criteria required to create a logical data container. Otherwise, the request processing sub-system may be configured to deny the request or perform one or more actions as will be described below.

Once the request processing sub-system has received the customer request to create a logical data container, the request processing sub-system, based on prior configuration of the sub-system, may determine 604 whether the request is for the creation of a WORM logical data container. If the customer has not specified that he or she wants a WORM logical data container, the request processing sub-system may create 614 the requested logical data container based on the parameters provided by the customer without any further customer input.

If the customer has submitted a request to create a WORM logical data container, the request processing sub-system may be configured to display 606 additional information or warnings related to the creation of a WORM logical data container. For instance, the request processing sub-system may transmit executable instructions that, when executed by a customer interface, may cause the customer interface to display an informative warning to the customer informing the customer that the creation of a WORM logical data container would preclude the customer from modifying or deleting any data objects stored therein until after the expiration date of the selected data object has transpired. Additionally, the informative warning may inform the customer that he or she may not be able to delete or modify the WORM logical data container until all data objects contained therein have expired. A customer may need to provide acknowledgement that he or she has read and understands the warnings or information provided prior to further processing of the request.

Once the customer request for a WORM logical data container has been submitted to the request processing sub-system and the additional information or warnings have been acknowledged, the process 600 may include determining 608 whether the request includes an expiry date for a data object to be stored within the WORM logical data container. An expiry date may be required in order to prevent modification or deletion of a data object within a WORM logical data container during the time prior to the expiry date. Additionally, once all data objects have expired, a customer may delete or modify the logical data container. Thus, if a customer has not specified an expiry date, the request sub-processing system may be configured to transmit executable instructions to the customer interface, causing the customer interface to display 610 an error message. The error message may provide information indicating that the customer must specify a definite expiry date prior to the creation of a WORM logical data container.

Accordingly, a customer may submit an updated request, such as through one or more properly configured API calls to the service, to create a WORM logical data container. This updated request may now include an expiry date for any data objects to be stored within the logical data container. Thus, the process 600 may include receiving 612 an updated request to create a WORM logical data container. The request processing sub-system may be configured to evaluate this updated request to determine 608 whether the request includes a valid expiry date. If the request still does not include a proper expiry date, the request processing sub-system may be configured to cause the customer interface to display 610 another error message.

If the request to create a WORM logical data container includes a proper expiry date and satisfies any other criteria necessary for the creation of a logical data container, the request processing sub-system may process the request and create 614 the WORM logical data container. Data objects that are included in a logical data container may be persistently stored within one or more data storage devices provided by the object-based data storage service. The request processing sub-system may select one or more data storage devices based on the criteria specified in the request. For instance, the customer request may include a preferred region where the data objects should be stored. The object-based data storage service may also maintain a plurality of storage devices specifically configured to store data objects associated with WORM logical data containers.

Once the request processing sub-system has created a logical data container based on the customer specifications provided in the request, a customer may now use the logical data container to persistently store one or more data objects. Accordingly, the process 600 may include receiving 616 one or more data objects for storage in a logical data container. If the customer has created a WORM logical data container, each data object to be stored in the WORM logical data container may be subject to the expiry date provided in the original request to create the logical data container. Thus, each data object in a WORM logical data container may not be deleted or modified until after the data object expiry date has passed. Additionally, a customer may not be able to modify or delete the WORM logical data container until all data objects stored within have expired. A customer, however, may have read-only access to all data objects stored within the WORM logical data container.

The request processing sub-system may receive 616 the data objects for storage in a logical data container asynchronously relative to performance of other operations of the process 600. For instance, once the logical data container has been created, the customer may not be required to provide one or more data objects immediately for storage in the logical data container. A customer may provide one or more data objects at different times. Alternatively, a customer may not provide a data object for storage, resulting in an "empty" logical data container. Thus, the request processing sub-system may receive data objects at any time after creation of the logical data container or not at all.

Figure 7:
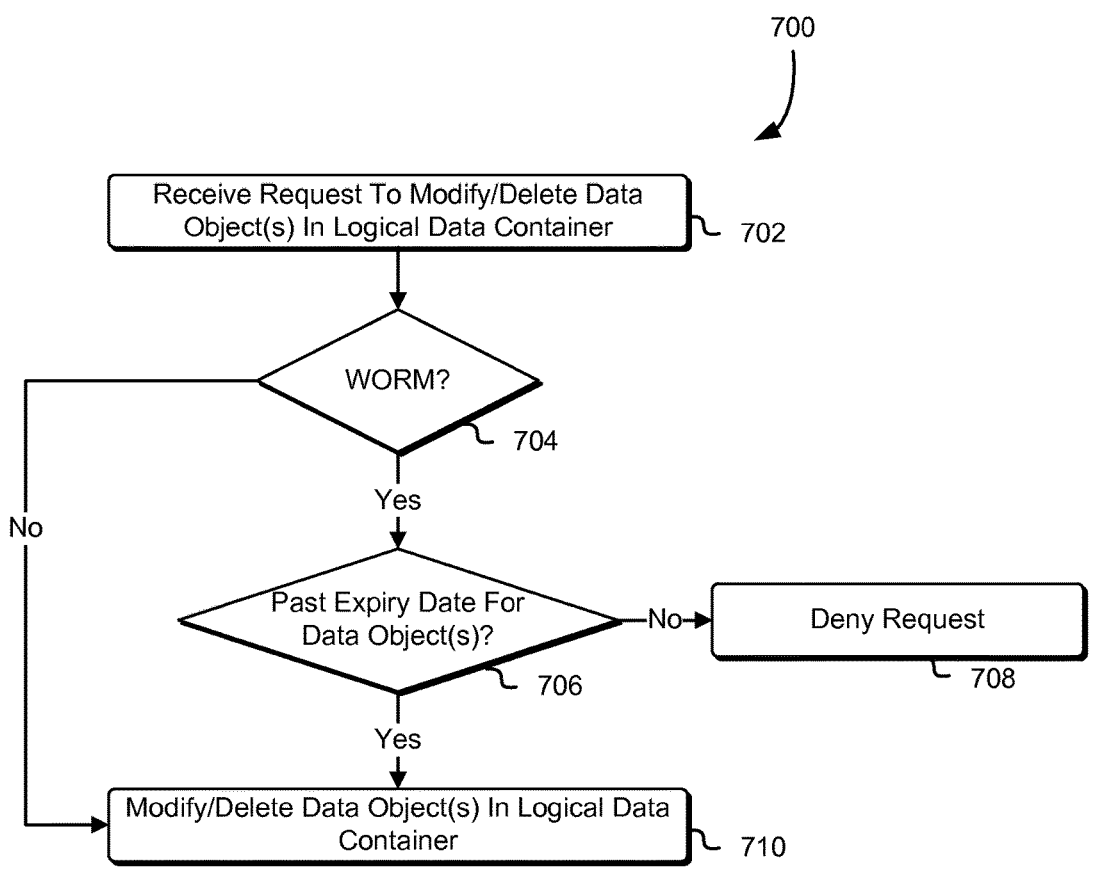
FIG. 7 shows an illustrative example of a process for handling requests to modify or delete a data object in a logical data container in accordance with at least one embodiment.

After a logical data container has been created, a customer may be able to submit one or more requests, such as through properly configured API calls to the service, to modify or delete any data objects stored therein. Accordingly, FIG. 7 is an illustrative example of a process 700 for handling requests to modify or delete a data object in a logical data container in accordance with at least one embodiment. In the process 700, a request processing sub-system may be configured to receive 702 one or more requests to modify and/or delete one or more data objects stored in a logical data container. The request may include the name of a logical data container associated with data objects stored in one or more data storage devices in the object-based data storage service. This may allow the request processing sub-system to perform one or more actions within the data storage devices according to the received request.

As noted above, a WORM logical data container may include additional restrictions that may prohibit certain actions from being taken on data objects stored therein. Accordingly, the process 700 may include determining 704 whether the request to modify or delete one or more data objects involves a WORM logical data container. If the request to modify or delete one or more data objects does not involve a WORM logical data container, the request processing sub-system may fulfill the request by modifying or deleting 710 the identified data objects from the logical data container. However, if the affected logical data container is a WORM logical data container, the request processing sub-system may be configured to further evaluate the request to determine whether it is to be fulfilled or denied.

Accordingly, the process 700 may include determining 706 whether the expiration date has passed for the data objects that are to be modified or deleted in a WORM logical data container. As noted above, a customer may specify an expiration date for each data objects that is to be stored in a WORM logical data container. At no point prior to the expiration date of a data object may a customer delete or modify the data object from the WORM logical data container. Thus, if the expiration date has not passed for the data objects that are the subject of the current request, the request processing sub-system may deny 708 the request. This may include transmitting executable instructions to the customer interface with may further cause the customer interface to display one or more error messages. These error messages may be used to indicate that the customer has requested a prohibited action. If the expiration date has passed for the data objects that are the subject of the current request, the request processing sub-system may accordingly modify or delete 710 the data objects in the WORM logical data container.

Figure 8:
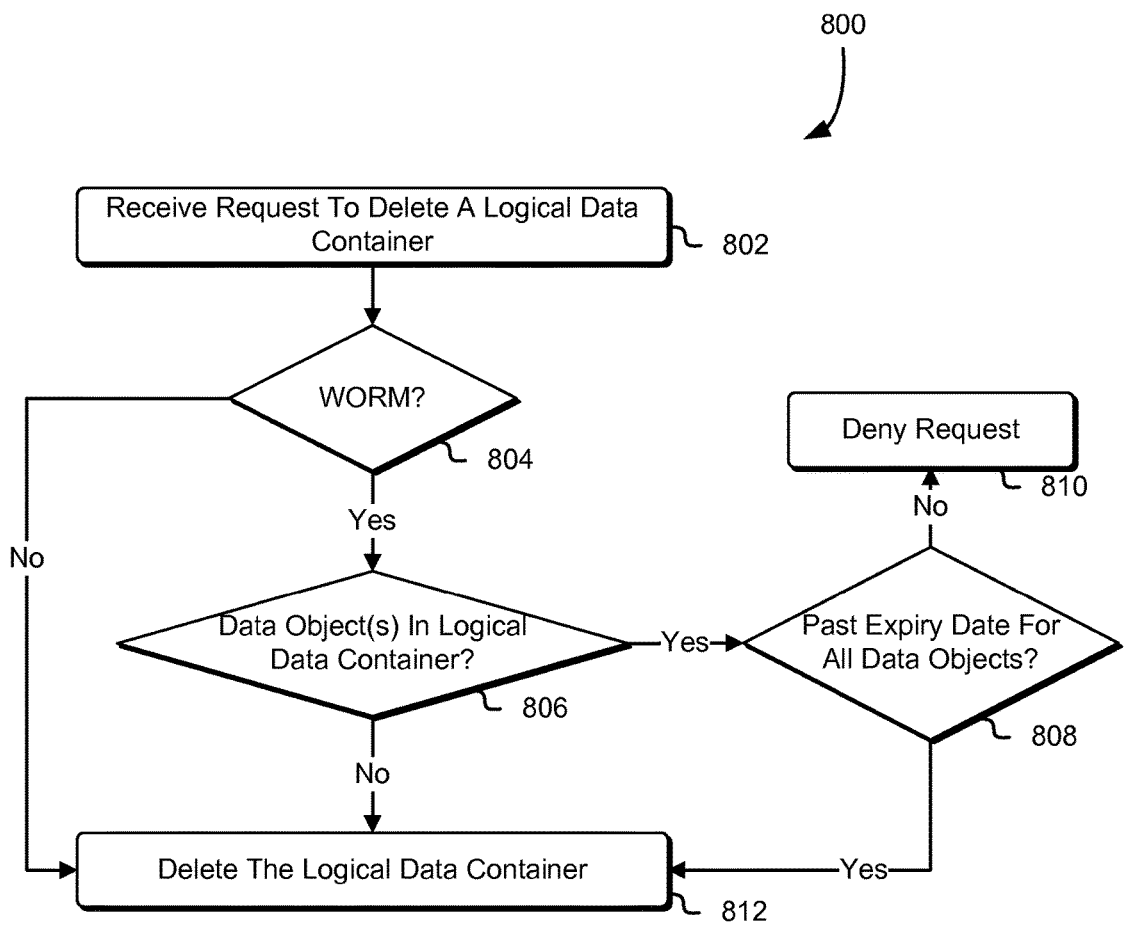
FIG. 8 shows an illustrative example of a process for handling a request to delete a logical data container in accordance with at least one embodiment.

A customer may, in a similar fashion, submit a request to delete a logical data container and its corresponding contents (e.g., data objects). Accordingly, FIG. 8 is an illustrative example of a process 800 for handling a request to delete a logical data container in accordance with at least one embodiment. Once a customer has submitted a request to delete a logical data container, the request processing sub-system may fulfill or deny the request based on the parameters of the request. Thus, the process 800 may include receiving 802 the request to delete a logical data container. The request may include the name of the logical data container that may be associated with one or more data objects currently stored in one or more data storage devices provided by an object-based data storage service.

As noted above, a WORM logical data container may be subject to additional restrictions that may prohibit a customer from performing one or more actions affecting the logical data container and its contents. Accordingly, the process 800 may include determining 804 whether the request to delete a logical data container relates to a WORM logical data container. If the logical data container is not a WORM logical data container, it may not be subject to any additional restrictions. Thus, a request to delete a logical data container that is not a WORM logical data container may be processed and the request processing sub-system may be configured to delete 812 the logical data container accordingly. However, if the logical data container subject to the customer request is a WORM logical data container, the request processing sub-system may be configured to perform additional checks to determine whether to fulfill or deny the request.

An additional check that a request processing sub-system may be configured to perform prior to processing a request to delete a WORM logical data container is to determine 806 whether the WORM logical data container includes one or more data objects. As noted above, a WORM logical data container may not be deleted if one or more data objects in the logical data container have not expired (e.g., the expiration date set for a data object has not transpired). Accordingly, if the WORM logical data container does include at least one data object, the request processing sub-system may be configured to determine 808 whether the current date of the request is past the expiration date for all data objects therein. If the WORM logical data container includes at least one data object that has not passed its expiration date, the request processing sub-system may be configured to deny 810 the request to delete the WORM logical data container. The request processing sub-system may be configured to transmit executable instructions to the customer interface, which when executed by the customer interface may cause the customer interface to display an error message detailing information regarding the denial of the request. If the WORM logical data container does not include any data objects or all the data objects within the WORM logical data container have expired, the request processing sub-system may process the request and delete 812 the WORM logical data container.

Figure 9:
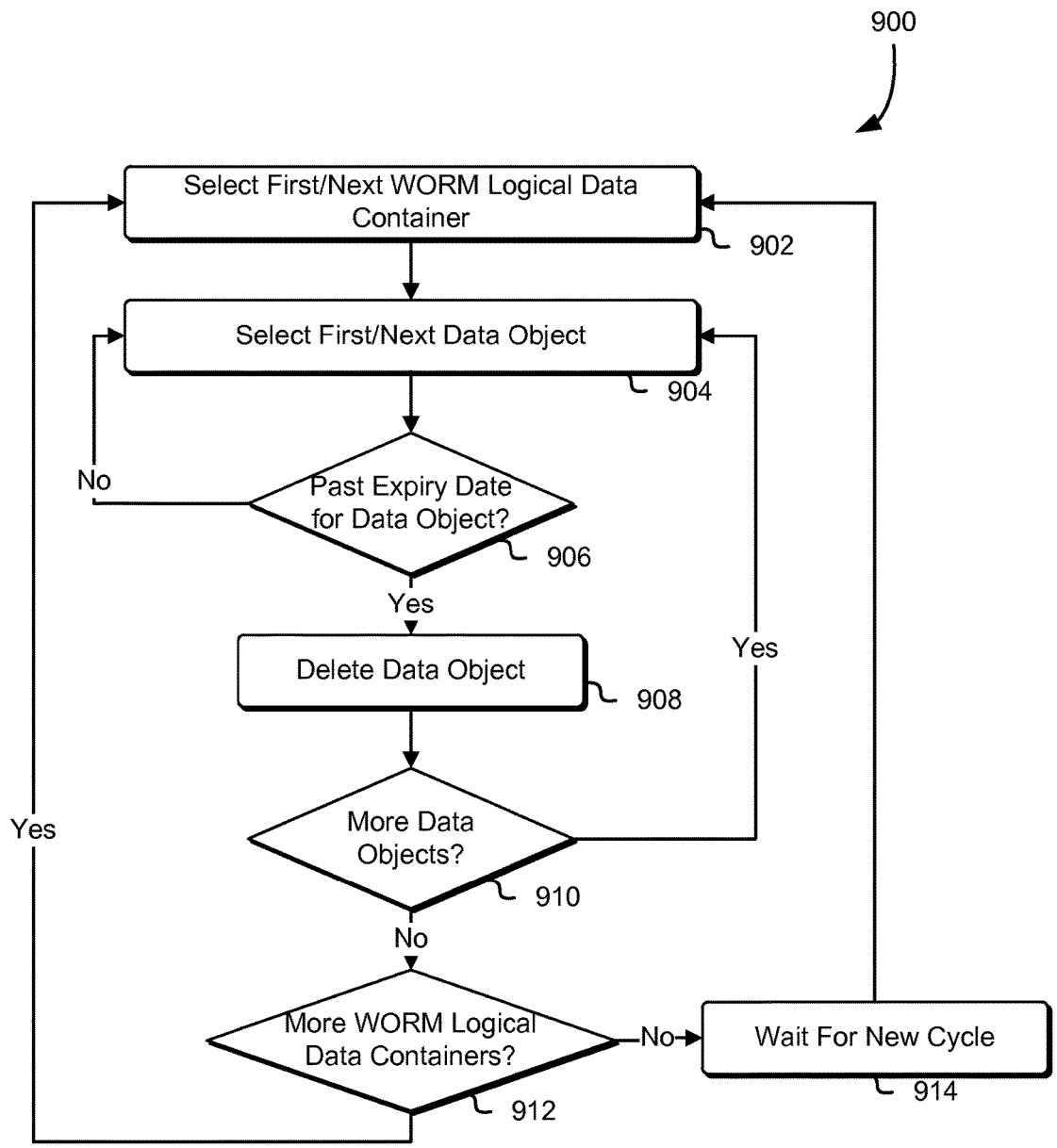
FIG. 9 shows an illustrative example of a process for finding and deleting expired data objects in one or more WORM logical data containers in accordance with at least one embodiment.

In an embodiment, the object-based data storage service provider may configure the service to evaluate each WORM logical data container within a plurality of storage devices to determine if any data objects may be deleted. This evaluation process and subsequent actions may be performed automatically such as in response to certain triggering events or at certain time intervals. Accordingly, FIG. 9 is an illustrative example of a process 900 for finding and deleting expired data objects in one or more WORM logical data containers in accordance with at least one embodiment. The object-based data storage service may be configured to begin finding expired data objects by first selecting 902 a first WORM logical data container from a plurality of WORM logical data containers. The selection of the first WORM logical data container may be made randomly or based on one or more encoded methods. For instance, the object-based data storage service may be configured to select a WORM logical data container with the earliest creation date. Alternatively, the object-based data storage service may be configured to select a WORM logical data container with the most data objects stored therein.

Once the first WORM logical data container has been selected, the object-based data storage service may be configured to select 904 a first data object stored within the selected WORM logical data container. Subsequently, the object-based data storage service may be configured to determine 906 whether the expiry data has passed for the selected data object. If the data object has not expired, the object-based data storage service may be configured to perform no actions on the data object and select 904 a next data object for review. However, if the data object has expired, the object-based data storage service may be configured to delete 908 the selected data object.

While deleting a data object is used extensively for the purpose of illustration in the present disclosure, the object-based data storage service may be configured to perform other actions upon discovering an expired data object. For example, in order to grant a customer the option of deleting or modifying an expired data object, the object-based data storage service may be configured to catalog all expired data objects in a database which a customer may access through the customer interface. Accordingly, as noted above, this information may be relayed to the customer through the notifications field illustrated in FIG. 5.

If the object-based data storage service has deleted a data object, the object-based data storage service may be configured to determine 910 whether there are any remaining data objects stored within the selected WORM logical data container. If the WORM logical data container still includes one or more data objects, the object-based data storage service may be configured to select 904 another data object to determine 906 whether the data object has expired and delete 908 the data object if it has expired. However, if there are no more data objects in the selected WORM logical data container, the object-based data storage service may be configured to determine 912 if there are remaining WORM logical data containers available for review.

If there are any more WORM logical data containers available for review, the object-based data storage service may be configured to select 902 a different WORM logical data container for review. In this fashion, the object-based data storage service may continue to evaluate all of the WORM logical data containers persistently stored within the service to ensure that all expired data objects have been deleted. Once all WORM logical data containers have been evaluated and no other WORM logical data containers remain, the object-based data storage service may be configured to wait 914 for a new cycle to begin. A new cycle may begin once a certain threshold of newly created WORM logical data containers has been reached. Alternatively, the object-based data storage service may be configured to perform a new cycle of checks after a certain time period. For example, a new cycle may be performed after twenty-four hours.

In another embodiment, the object-based data storage service provider may configure the service to maintain, in a key value store, the expiration date for each data object stored in all WORM logical data containers stored within. Thus, the object-based data storage service may be configured to evaluate the key value store and determine whether any data objects have expired. If a data object has expired, the object-based data storage service may automatically delete the expired data object. The object-based data storage service may be configured to query the key value store after a certain amount of time or as a result of a triggering event. For instance, the object-based data storage service may query the key value store once a certain threshold of newly created WORM logical data containers has been reached. Alternatively, an evaluation of the key value store may be made after twenty-four hours or at another interval or in accordance with a non-periodic schedule.

While the present disclosure uses an object-based data storage service (e.g., either on-demand or archival) for the purpose of illustration, the present disclosure is not limited to such services. For instance, the techniques described above may be implemented in different data storage services. For example, a computing resource service provider may implement WORM data storage in a block-level data storage service. A block-level data storage service may comprise a collection of computing resources that collectively operate to store data for a customer. For instance, the block-level data storage system may be configured to provide block-level data storage volumes for use with a virtual machine instance, as noted above. A customer may interact with the block-level data storage service to provision a block-level data storage volume that, in turn, may be mounted as a storage device (e.g., hard drive) onto a virtual machine instance. The storage volume may be configured to behave like a raw, unformatted block storage device with a block level customer interface. Accordingly, a customer, through properly configured API calls to the service, may create a file system on top of the block-level data storage volumes or utilize the volume as a block-level storage device (e.g., a hard drive).

Thus, WORM data storage in a block-level data storage service may require a customer to specify the storage capacity of a WORM volume. This may be specified using a GUI as described in FIG. 4. Whereas an object-based data storage service may utilize identifiers for the creation of a logical data container, a block-level data storage service may allow a customer to use a data volume, of a certain capacity, as a logical data container.

Figure 10:
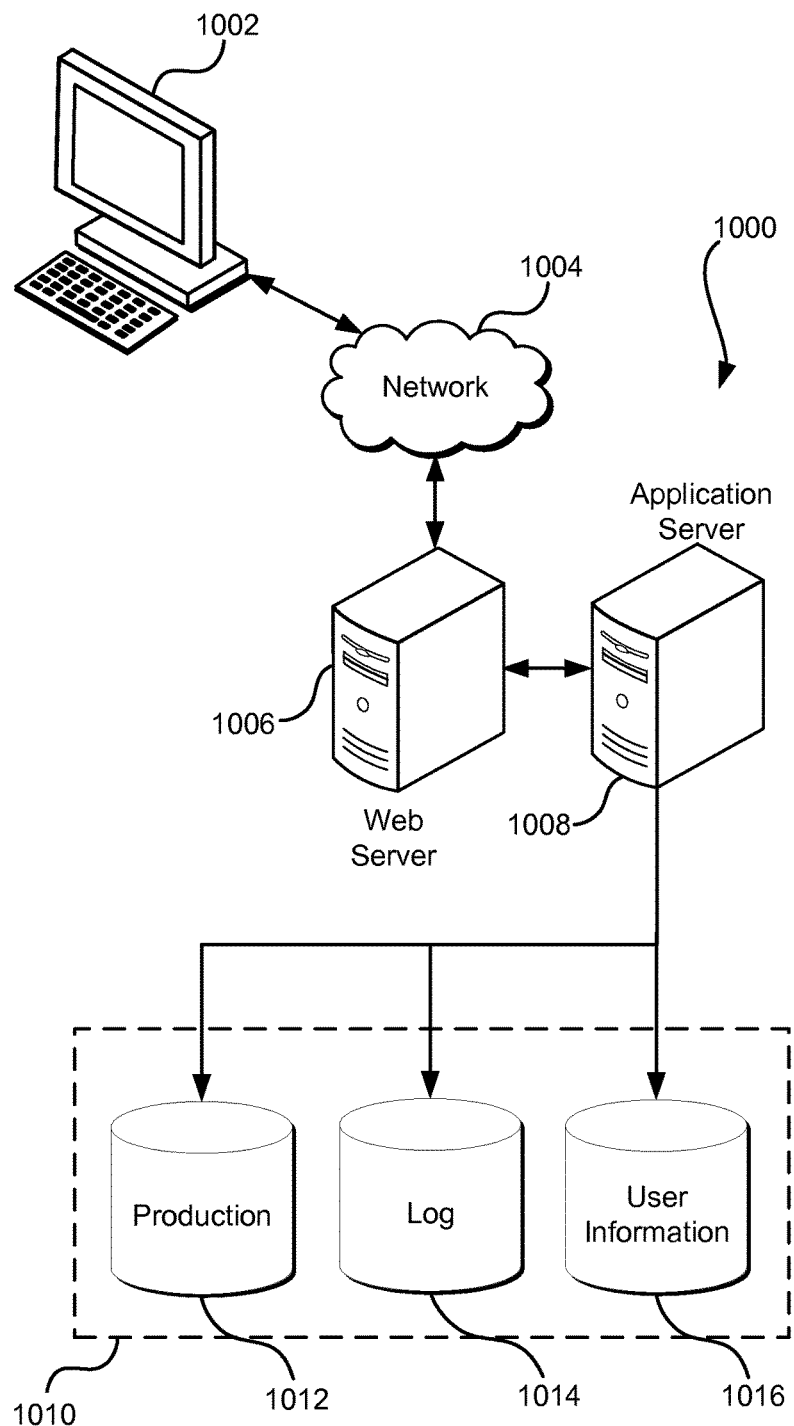
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1010 can include several separate data tables, databases or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/ or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: $\{A\}$, $\{B\}$, $\{C\}$, $\{A, B\}$, $\{A, C\}$, $\{B, C\}$, $\{A, B, C\}$. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising: receiving, from a customer of a computing resource service provider, a first request to create a logical data container and specifying that data objects, once virtually added to the logical data container are to be unmodifiable for a predetermined amount of time, the logical data container being a storage location that: is backed by a plurality of physical storage devices; and is managed by an object-based data storage service to virtually store a set of data objects that are physically stored on the plurality of physical storage devices;
   creating the logical data container in response to the first request, the logical data container being configured such that identifiers associated with data objects stored separately on the plurality of physical storage devices, once the identifiers are added to the logical data container, make the associated data objects unmodifiable by customer-submitted application programming interface calls;
   receiving a second request to virtually store a data object in the created logical data container; virtually storing, in the created logical data container, the data object such that any requests to modify the stored data object are denied during the predetermined amount of time; and performing one or more actions affecting the virtually stored data object after the predetermined amount of time has passed including automatically deleting the virtually stored data object once the predetermined amount of time has passed.

2. The computer-implemented method of claim 1, further comprising:
   receiving a third request to modify or delete the created logical data container; and
   determining if the predetermined amount of time has passed for all virtually stored data objects in the created logical data container; and denying the third request if the predetermined amount of time has not passed for all the virtually stored data objects in the created logical data container.

3. The computer-implemented method of claim 1, further comprising receiving a third request to modify or delete a data object virtually stored in the created logical data container prior to passing of the predetermined amount of time and denying the third request based at least in part on the data object not being virtually stored in the created logical data container for the predetermined amount of time.

4. The computer-implemented method of claim 1, wherein the predetermined amount of time is a finite amount of time such that each data object, once virtually stored in the created logical data container, is unmodifiable for the finite amount of time.

5. The computer-implemented method of claim 1, further comprising receiving a third request to create a second logical data container, the request specifying that data objects are modifiable once virtually added to the second logical data container.

6. A computer-implemented method for managing data storage, comprising:
   receiving, from a third party computing device to an interface for a virtual data storage service that is an abstraction of a location for storing data objects, the location backed by a plurality of physical storage devices that are managed by an object-based data storage service into a virtual storage object, a first request that specifies a condition that data objects physically stored in the plurality of physical storage devices, when associated with a modification identifier, are to be unmodifiable for an amount of time;
   in response to the first request, updating the virtual data storage service such that data objects stored in the plurality of physical storage devices, once associated with the modification identifier, are unmodifiable by customer requests to the virtual data storage service;
   receiving a second request to virtually store a data object in association with the modification identifier, the data object physically stored on one or more of the plurality of physical storage devices;
   virtually storing the data object in a logical data container by storing a data object identifier corresponding to the data object in the logical data container such that any requests to modify the virtually stored data object physically stored separately on one or more of the plurality of physical storage devices are denied during the amount of time; and
   deleting the virtual data storage service when all data objects within virtual data storage service have passed an expiration date for which the data objects are unmodifiable for an amount of time.

7. The computer-implemented method of claim 6, wherein the modification identifier is a logical data container associable with a plurality of data objects.

8. The computer-implemented method of claim 6, further comprising receiving a third request to modify the stored data object in the created logical data container prior to passing of the amount of time and denying the third request based at least in part on the amount of time having yet to pass.

9. The computer-implemented method of claim 6, further comprising receiving a third request to modify the stored data object in the created logical data container after passing the amount of time and fulfilling the third request.

10. The computer-implemented method of claim 6, further comprising receiving a third request that specifies that data objects, when associated with a second modification identifier, can be modified at any time.

11. The computer-implemented method of claim 6, wherein the amount of time is a finite amount of time during which the stored data object is unmodifiable.

12. A data storage system, comprising: a plurality of physical data storage devices managed by an object-based data storage service that physically stores data sets and that virtually store data sets in logical data containers that are an abstraction of a location for storing data objects based at least in part on identifiers associated with the data objects, wherein the identifiers are stored in the logical data container separately from the data objects stored by the plurality of physical data storage devices, the location being backed by at least a portion of the plurality of physical storage devices and managed by the object-based data storage service into a virtual storage object, the location being further defined by an association of data set identifiers corresponding to physically stored data with logical data containers; and a request processing hardware subsystem executing instructions to:

receive, through an application programming interface, a request to modify data in a virtually stored data set corresponding to a particular data set identifier;

process the received request in accordance with a determination, based at least in part on a condition on the particular data set identifier that requires data in the virtually stored data set to remain unmodified for an amount of time, of whether the amount of time has transpired for the virtually stored data set; and delete logical data containers when all data sets within logical data containers have passed an expiration date for which the data sets are unmodifiable for an amount of time.

13. The data storage system of claim 12, wherein the virtually stored data set includes a collection of one or more virtually stored data objects.

14. The data storage system of claim 12, wherein the request processing subsystem further executes instructions to process a received request to modify data in a virtually stored data set corresponding to another virtually stored data set identifier lacking the condition.

15. The data storage system of claim 12, wherein processing the received request includes denying the received request as a result of the particular data set identifier being associated with the condition.

16. The data storage system of claim 12, wherein processing the received request includes fulfilling the request as a result of the amount of time having transpired for the virtually stored data set.

17. The data storage system of claim 12, wherein the request processing subsystem further executes instructions to receive a request to create another data set identifier for which virtually stored data objects are modifiable at any time.

18. One or more non-transitory computer-readable storage media having collectively stored therein instructions that, if executed by one or more processors of a virtual data storage system, cause the virtual data storage system to:

create a logical data container that is an abstraction of a location for storing data objects, the location backed by a plurality of physical storage devices and managed by an object-based data storage service into a virtual storage object that is accessible as a single logical unit, the logical data container subjects to a condition that requires data to be stored virtually within the logical data container to be unmodified for an amount of time based at least in part on identifiers associated with the data objects, wherein the identifiers are stored in the virtual storage object separately from the data objects stored by the plurality of physical data storage devices;

virtually store, in accordance with the condition, a plurality of data sets associated with the logical data container in one or more virtual storage devices maintained by the virtual data storage system, each data set of the plurality of data sets received through an application programming interface of the data storage system, and the plurality of data sets including multiple data sets received to the virtual data storage system at different times; and modify a particular data set of the plurality of data sets when the amount of time for the particular data set has transpired while leaving unmodified one or more data sets of the plurality of data sets for which the amount of time has yet to transpire including automatically deleting a particular data set of the plurality of data sets as a result of the amount of time for the particular data set having transpired.

19. The one or more non-transitory computer-readable storage media of claim 18, wherein modifying the particular data set includes deleting the particular data set.

20. The one or more non-transitory computer-readable storage media of claim 18, wherein the instructions further cause the virtual data storage system to process a request, to the application programming interface, to modify a specified data set within the logical data container and deny the request as a result of the amount of time having yet to transpire for the specified data set.

21. The one or more non-transitory computer-readable storage media of claim 18, wherein the instructions further cause the virtual data storage system to create logical data containers to for which data sets are modifiable, through corresponding requests to the application programming interface, without requiring a corresponding amount of time to transpire.

22. The one or more non-transitory computer-readable storage media of claim 18, wherein creating the logical data container is performed as a result of receipt, through the application programming interface, of a request to create the logical data container, the request specifying the condition.

23. The one or more non-transitory computer-readable storage media of claim 18, wherein the application programming interface is a web services interface accessible on a public communications network.

\* \* \* \* \*